May 6, 1941.    M. C. MEYER    2,241,365

CURVED SURFACE LIGHT REFLECTING ORNAMENT

Filed June 12, 1940

INVENTOR.
Maximilian C. Meyer
BY Ostrolenk + Greene
ATTORNEYS.

Patented May 6, 1941

2,241,365

UNITED STATES PATENT OFFICE 2,241,365

CURVED SURFACE LIGHT REFLECTING ORNAMENT

Maximilian C. Meyer, Brooklyn, N. Y.

Application June 12, 1940, Serial No. 340,157

21 Claims. (Cl. 18—48)

My invention relates to a novel method of forming ornamental objects from plastics containing oriented faceted light reflecting particles, and to the articles produced thereby. My invention more particularly relates to the method of forming an elongated plastic body whose section is a conic section in which faceted light reflecting particles are oriented or aligned so that they lie in directions which are substantially parallel to the surface of said elongated body, and cutting or grinding said elongated body transversely to the direction of orientation of the faceted light reflecting particles to provide ornamental objects having a curved periphery, the curved periphery being parallel to the long axis of the body and intercepting a multiplicity of layers of said faceted light reflecting particles, whereby an article is produced in which variant light reflecting effects are obtained, the light reflection being strongest in the peripheral portion of the ornamental object which lies closest to the original periphery of the elongated body, the light reflection being substantially less in the portion of the ornamental object close to the original axis of the elongated body.

It is an object of my invention to obtain ornamental objects having a curved periphery, which under light have a cat's eye effect.

It is a further object of my invention to provide an ornamental object cut en cabochon, which object has a specific peripheral area capable of reflecting light from faceted light reflecting particles therebeneath, which particles are oriented or aligned in substantial parallelism to the surface of the body, the curved nature of said specific peripheral surface being such that light is or appears to be more strongly reflected from a restricted area therein in a single reflection than from the remainder of the visible specific area.

It is a further object of my invention to provide an ornamental object having a curved peripheral surface comprising a specific area below which faceted light reflecting particles are oriented in substantial parallelism to said specific peripheral surface, and at least one other second specific peripheral surface beneath which the particles are oriented in directions substantially out of parallelism with said second peripheral surface.

It is another object of my invention to provide a novel ornamental object containing faceted light reflecting particles distributed uniformly throughout said object and oriented in the form of concentric layers which lie substantially parallel to a specific peripheral surface area.

It is a further object of my invention to provide a novel ornamental object in which faceted light reflecting particles are distributed in an area adjacent a specific peripheral portion of the object, said light reflecting particles being oriented so as to lie substantially parallel to said specific peripheral portion.

It is a further object of my invention to provide a novel method of forming an ornamental object in which I form an elongated body such as a rod or cylinder containing faceted light reflecting particles such as pearl essence oriented therein in layers concentric with respect to the axis of said elongated body and cutting said elongated body to provide ornamental objects having a curved periphery, which curved periphery extends in a direction parallel to the original axis of the body, said curved periphery intercepting a multiplicity of said concentric layers.

These and further objects of my invention will be apparent from a consideration of the description which here follows.

The novel effects of orienting faceted light reflecting media such as pearl essence in a plastic body in order to obtain a lustrous sheen effect is basically set forth in Patent No. 1,607,623 of November 23, 1926 and Patent No. 1,607,624 of November 23, 1926.

I have found that by distributing and orienting faceted light reflecting particles in a particular manner in a plastic and by cutting such plastic body in a specific manner, I can obtain ornamental objects in which variant light effects are observed under light reflection, and in which cat's eye light reflecting effects are obtainable.

The synthetic plastics which may be employed in my invention include, for example, resins, such as the methacrylates and the acrylates, formaldehyde condensation products, particularly urea and phenol formaldehyde condensation products, vinyl compounds and other similar resins, natural and synthetic. In addition to these resins I may employ other synthetic plastics such as the cellulosic derivatives including cellulose esters, such as cellulose nitrate and cellulose acetate and cellulose ethers such as ethyl and benzyl cellulose. Other plastic materials which are at least translucent may also be employed. By "at least translucent" I mean transparent or translucent.

As a specific example of the plastic I may employ I have found that methyl methacylate, sold under the trade name of Lucite gives extremely desirable results. It is peculiarly adapted to the requirements of the present invention, particularly because of its excellent transmission of light and also because of its index of refraction which varies from 1.50 to 1.52, and because of its clarity and absence of any interference. Further, it has a low light absorption. This combination of properties produces an ornamental object having a new and unexpected appearance when formed in accordance with the process to be hereinafter set forth.

This permeability to light is essential since light is reflected from faceted light reflecting particles which lie beneath the external surface of the object. As the light reflecting medium specifically referred to as faceted light reflecting particles, I prefer to employ pearl essence derived from fish scale, but it is within the purview of my invention to employ suitable other reflecting media which may be oriented within a plastic and which have the property of reflecting light and which are commonly designated in the plastics industry as pearly, nacreous, silky, metallic, chatoyant, etc. As examples of such other reflecting media, I suggest the use of metallic faceted particles, faceted pigments or light reflecting media with faceted surfaces generally. Such light reflecting media are generally in the form of lamellae, i. e. flat plates, crystals and the like.

The ornamental objects produced according to the present invention may be employed in rings, necklaces, earrings, brooches, and for buttons, buckles, studs and the like.

The plastic may be given a suitable color by means of any suitable coloring medium, but I prefer to employ a dye since a dye coloring medium does not impair the light transmitting properties of the plastic above described.

By cat's eye effect I mean that in a specific area capable of reflecting light, the light reflection is apparently concentrated in a specific portion of that area which is less than the area itself and the reflection is in an elongated form generally similar to the appearance of a cat's eye at night. Cat's eye effect is generally defined in the jewelry art as opalescent reflections from within a gem like the eye of a cat.

For a more particular explanation of the process of my invention and the structure of the ornamental object of my invention, I refer to the drawing in which Figure 1 is a plan view of the plastic elongated body in the form of a rod.

Figure 1:
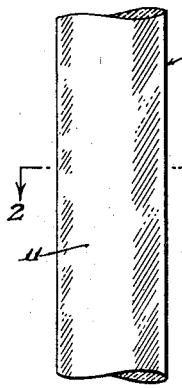

Referring now more specifically to the drawing, in Figure 1 I show a plastic rod generally denoted as 10, which contains oriented faceted light reflecting particles which give the rod a uniform lustrous sheen effect denoted as 11.

Figure 2:
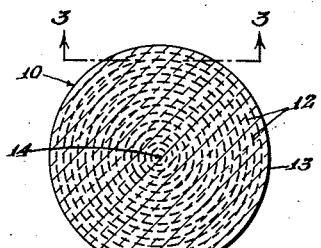
Figure 2 is a cross section taken along the line 2—2 of Figure 1 showing the orientation of the faceted light reflecting particles in layers or directions which are concentric about the center or axis of the body and which lie parallel to the surface of the body.

In Figure 2, which is a cross section of the rod as designated I show faceted light reflecting particles 12. In the particular example shown the conic section is that of a circle having a circular periphery 13 and a center 14. The center 14 corresponds to the longitudinal axis of the elongated plastic rod 10. It will be noted that the faceted light reflecting particles lie in layers and for the purpose of clarity these layers are shown as circular in form. It will be understood that the particles are spaced from one another and are not arranged in the form of a continuous circle.

As a specific example of the preferred method of carrying out the process of my invention, I form a mix comprising the monomer of methyl methacrylate and add to that suitable coloring matter such as a dye which has previously been prepared so as to be thoroughly miscible with the methyl methacrylate, and to this mix I add pearl essence as a faceted light reflecting medium. Pearl essence comprises individual small flake-like particles ranging in length from 1-thousandth to 1-fifty-thousandth of an inch and ordinarily being approximately in width one-fifth the length.

The pearl essence is added to the methyl methacrylate monomer in the form of a paste to effect a more homogeneous distribution therethrough and the finished mix, comprising the pearl essence distributed in the monomer of methyl methacrylate, is a heavy syrupy liquid. This liquid is poured into a mold of suitable size and shape and, as shown in Figure 2, when a circular cross section is to be obtained then the mold is in the form of a cylinder. The orientation of the pearl essence light reflecting particles in the plastic is effected during the polymerization operation, the pearl essence particles arranging themselves in directions substantially concentric to the long axis of the elongated body, namely parallel to the surface of revolution thereof. The monomer is then completely polymerized to solid form, the faceted particles being set in their properly oriented positions (see Fields et al. Patent No. 2,168,331).

In using other moldable materials, the orientation of the light reflecting particles can be effected in any desired manner as by an extrusion, stretching or electrical means.

Figure 3:
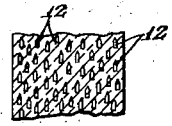
Figure 3 is a detailed cross section taken along line 3—3 of Figure 2.
Figure 4:
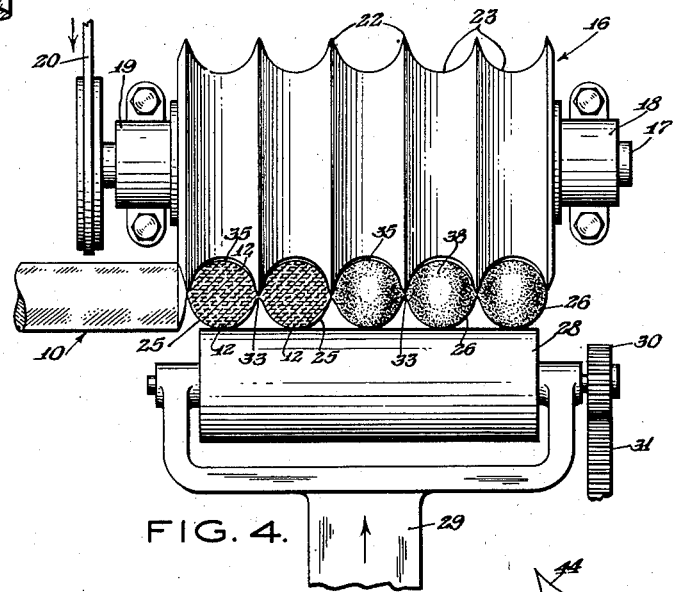
Figure 4 is a side elevation of an apparatus suitable for carrying out the process of my invention showing certain of the ornamental objects in cross section and others in elevation.

The particles 12, as shown in the small section of Figure 3, are believed to extend with their long axes extending in the direction of the long axis 14 of the elongated plastic rod 10. The plastic rod 10 with the faceted light reflecting particles 12 oriented therein, as shown in Figures 2 and 3, is then cut by grinding by the apparatus shown in Figure 4. Generally, the apparatus comprises a grinding wheel 16 suitably mounted on a shaft 17 carried in brackets 18 and 19, which shaft is driven by a suitable source of power 20. The grinding wheel 16 is so shaped with peaks 22 and valleys 23 that it is capable of cutting the cylindrical rod 10 into ball like objects 25 and 26.

It is important that the grinding be carried out in the presence of quantities of water. This grinding is particularly efficacious with methyl methacrylate.

The pusher roll 28 held forwardly by the mounting 29 and rotated by means of the engaging gears 30 and 31, presses the rod into the grinding wheel 16 with its peaks 22 and valleys 23. The grinding wheel grinds away the plastic rod 10 forming the spherical objects 25 and 26, the grinding wheel 16 and the pusher roll 28 being so positioned with respect to one another that by their continued rotation the spherical objects are rotated in various directions when the last joining portion 33 between the spherical objects is ground away. The spherical objects 26 are shown in cross section taken through the middle of the spherical objects. The spherical objects 26 are shown in perspective with the stippling effect intended to show the light reflection by the faceted light reflecting particles in such objects.

It is to be noted that the cutting or grinding by the wheel 16 produces a curved surface 35 that cuts down through and intercepts a multiplicity of layers of said faceted light reflecting particles 12. This grinding operation not only cuts the rod into the spherical shape shown, but also skins off the outermost layer of the rod at the deepest portion of the valley 43. I have found this skinning off or grinding off of the outermost layer of the rod to be important in obtaining the new and unexpected results of my invention. After the grinding and separation are completed, as has been stated, the spherical objects are rotated and finished down to a uniform surface between the grinding wheel 16 and the pusher roll 28. Thereafter the spherical objects 26 are polished by a suitable polishing mechanism, such as a tumbler acting in conjunction with a suitable abrasive for polishing mixes.

If the complete outer skin is not removed by the grinding, the appearance of the resulting ornament is inferior.

Figure 5:
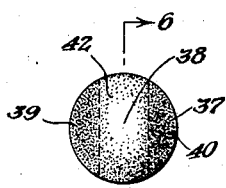
Figure 5 is a side elevation of the ornamental object of my invention.

Figure 5 shows a perspective of the finished polished spherical object 37 which corresponds to the spherical object 26, except that it has been finished off and polished. It will be noted that light is reflected from the faceted light reflecting particles beneath the area 38 while substantially little or no light is reflected from the faceted light reflecting media beneath the side areas 39 and 40. The exterior surface of this spherical object which of course is curved along at least two different axial directions may be described as having at least two different surface areas or surface portions or curvatures. In this Figure 5, the numeral 38 denotes a first surface area or portion and the numerals 39 and 40 denote a second and third surface area or portion respectively.

Figure 6:
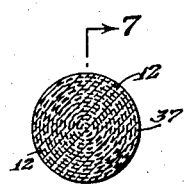
Figure 6 is a cross section taken along the line 6—6 of Figure 5.

Figure 6 is a cross section taken along the line 6—6 of Figure 5 and shows the orientation of the faceted light reflecting particles 12 in the article of my invention. The peripheral band area, which is generally defined by the circle 42, is shown in dotted line in Figure 5 since it is indicative only of the area beneath which the faceted light reflecting particles are capable of reflecting light.

Figure 7:
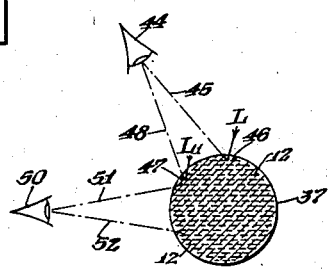
Figure 7 is a cross section taken along the line 7—7 of Figure 6 to show the orientation of the faceted light reflecting media in the ornamental object of my invention and its light reflecting properties with regard to two different positions of the eye.

In Figure 7, which is a cross section taken along the line 7—7 of Figure 6, I have illustrated the light reflecting properties of the faceted light reflecting particles 12 oriented in the spherical object 37. Taking the view of the eye 44, it will be noted that light from a source L will be reflected along the path 45 from the light reflecting particles 46 which lie generally in the direction of the surface of the object, and which are capable of reflecting light through the surrounding plastic medium which is at least translucent. Light may be reflected from the source L₁ along the path 48 from the faceted light reflecting particles 47 to the eye 44 since the light reflecting particle is oriented to reflect light to the eye. Light from the light source L₁ can penetrate to the faceted light reflecting particle 47 since only a few faceted light reflecting particles lie between this particle 47 and the light source. The pearl essence which I have shown here is translucent and hence will transmit light.

In contradistinction to the light reflection above described in connection with the viewing eye 44, it will be noted that when the eye is in the position 50 it views the oriented faceted light reflecting particles 12 which lie beneath the side area of the spherical object 37 edgewise along paths 51 and 52, and as in the case of the eye viewing a mirror edgewise, no light reflection is obtained. In between the positions 44 and 50 of the eye variant light effects are obtained.

It is difficult to illustrate the light reflecting properties of an ornamental object formed as here described in a diagrammatic showing such as is afforded by the sketches and accordingly a more detailed description will be set forth.

A plastic ornamental object which is the product of the present invention, has a curved surface. This curved surface extends from a point just below the original peripheral skin of the plastic rod 10 down to a point closer to or corresponding to the original axis of the plastic rod 10. The curved surface so cut, cuts through a multiplicity of the layers of faceted light reflecting particles 12 and accordingly the faceted light reflecting particles within the object are positioned at a succession of different angles with respect to the cut curved surface. It is the successive change of the angles of viewing that account for the variant light reflecting effects.

By way of specific example, when a spherical object is cut from the plastic rod 10, such as is shown in the drawing, the plastic ornamental object so formed has faceted light reflecting particles distributed homogeneously throughout the ornamental object. The orientation of the light reflecting particles is shown in Figure 6 and it will be noted that these particles are oriented generally in the direction of a specific peripheral surface area. This specific peripheral surface area corresponds to the original surface of revolution of the plastic rod 10 and the axis about which these particles are concentrically arranged corresponds to the original axis of the rod 10. In that specific peripheral area, the light reflecting particles are substantially parallel to that surface area and are capable of reflecting light through the transparent or translucent plastic and the surface thereof. However, because of the curved nature of the surface a certain lens effect results and the light is reflected in a concentrated area. Also, because the faceted light reflecting particles, which act as tiny mirrors, are lying at different angles to one another, although all are concentric with the center, light is reflected to an object such as the eye from a restricted number of such particles at one time and not from beneath the entire specific peripheral area beneath which the particles lie in substantial parallelism to the surface.

In Figure 5 I have designated by dotted lines a central peripheral band area which is the specific peripheral band area referred to. The light reflecting particles beneath that surface lie in substantial parallelism thereto.

On each side of this spherical object, namely in the side areas 39 and 40 of Figure 5, the cutting of the surface is such that the faceted light reflecting particles therebeneath are out of parallelism with the surface, and in fact, lie at substantially right angles thereto. Accordingly, since these particles, like mirrors, are viewed edgewise, there is no reflection therefrom and the side areas are dark areas.

It is a further feature of my invention that when the ornamental object is rotated sideways, that is about an axis at right angles to the original axis of the rod 10, that the area of light reflection of the light reflecting particles beneath the surface moves faster than does the object itself. This is probably due to the lens effect of the cut, curved surface.

In defining the plastic ornamental object of my invention, the essential prerequisites are that it have oriented faceted light reflecting particles distributed therein and that such ornamental object is cut to provide a curved surface, the curved surface comprising a first specific peripheral surface area, the faceted light reflecting particles beneath the first specific peripheral surface area being oriented generally in the direction of said first specific peripheral surface area so that light is strongly reflected from said faceted light reflecting particles through said first specific peripheral surface area, said curved surface also comprising a second specific peripheral surface area, the faceted light reflecting particles beneath said second specific peripheral surface area being oriented in a direction materially different from the direction of said second specific peripheral surface area so that substantially less or no light is reflected from said faceted light reflecting particles through said second specific peripheral surface area, said faceted light reflecting particles beneath said second peripheral specific surface area being substantially parallel to the faceted light reflecting particles beneath said first specific peripheral surface area, said first specific peripheral surface area being so cut that light is reflected substantially more strongly from an area therein that is less than the entire visible area of the said first specific peripheral surface area. The curved peripheral surface of my ornamental object is so cut as to intercept a multiplicity of layers of oriented faceted light reflecting media so that while in the original plastic rod from which the article is formed, the faceted light reflecting particles lie substantially in the direction of or parallel to the long surface or surface of revolution thereof, in the finished object the curved surface is such that the faceted light reflecting particles, which are still in their original position, lie at different angles with respect to the finished curved surface.

It is this feature of providing a curved surface so that the oriented faceted light reflecting particles therebeneath are viewed at different angles that produces the light reflecting effects.

Thus I can form a strip of plastic material containing light reflecting particles in which the cross section instead of showing the particles in concentric circles as shown in Figure 6 of the drawing, would show a plurality of superimposed parallel layers. By cutting a curved surface into this strip I would obtain the effects shown in Figure 7 in which, beneath different peripheral surface areas different viewing angles of the particles therebeneath are provided.

It is to be understood that by the use of the term plastic I mean any moldable material or any material which may be worked as herein described.

To provide ornamental objects for use in rings, brooches, studs and the like, I cut the plastic containing the oriented faceted light reflecting particles en cabochon so that the specific peripheral band area beneath which the light reflecting particles lie in substantial parallelism extends centrally over the periphery of the object with two dark side areas at the sides of this central peripheral band.

When employing the spherical objects in necklaces, it is desirable that the opening through the spherical object correspond to the original axis of the rod from which the ball is formed, which axis lies normal to the plane of the band area capable of reflecting light.

By boring the spherical object through in this manner, the band of light reflecting surface is concentric around the strand which carries the spherical objects and presents a very desirable appearance. Any movement of the necklace causes light to shimmer back and forth through the light reflecting band area with the area of more concentrated light reflection varying accordingly.

In the formation of a ring I cut the ornamental object en cabochon so that the band of light reflecting area passes over the apex or high point of the object.

Certain variations are possible in this construction by means of which the desirable light reflecting properties of the final object can be obtained. For example, instead of homogeneously distributing the faceted light reflecting particles throughout the mass arranged in concentric layers, I may distribute the particles in the same general directions, that is concentrically, but distributed only in the periperal area of the object. Thus, I may form a rod having faceted light reflecting particles located only in the peripheral area thereof, that is just below the surface of revolution so that upon the transverse curved cutting, as shown in the drawing, a light reflecting band surrounded by non-reflecting areas is obtained. So long as the cutting is so arranged that a multiplicity of layers is intersected, the variant effects can be obtained.

I should like to emphasize the importance of the grinding operation described herein. I have found that an article having vastly improved properties from the appearance standpoint is produced by grinding down the rod as shown in the drawing. The grinding, I have found, can be carried out by using a grinding stone together with large quantities of water. It is greatly superior to the process of cutting the plastic material as by a knife.

Another feature of importance lies in the fact that I have found it essential that the outermost skin be removed in the formation of the final object. It appears that the extreme peripheral skin is so ironed during the formation of the rod material that it does not have the proper light reflecting properties and must be removed.

The claims of the present application are directed to curved ornamental objects having different areas of different light reflectivity and the method of making the same. The features of manufacturing ball-like objects from a molded plastic rod are set forth and covered in my co-pending application Serial No. 388,206, filed April 12, 1941.

I claim:

1. An object comprising a colored plastic having a relatively high light transmitting characteristic, said object having light reflecting lamellae distributed therein, said light reflecting lamellae being aligned in said plastic in a predetermined direction and uniform manner, said object having an exposed curved surface that is generally convex, said exposed surface comprising a first curved surface portion and a second curved surface portion, said first surface portion extending generally parallel to the direction of alignment of said light reflecting lamellae so that light is reflected from said light reflecting lamellae through said first surface portion, the curvature of said first surface portion being such that upon viewing said first curved surface portion light appears to be reflected therethrough from said light reflecting lamellae more strongly from one area thereof than from the remaining areas thereof so as to produce a cat's eye effect, said second curved surface portion being inclined with respect to the direction of alignment of said light reflecting lamellae so that the light reflected therethrough is negligible relative to the light reflected through said first surface portion, said first surface portion and said second surface portion being contiguous and merging in the form of a continuous curvature.

2. An object formed of a colored plastic having a relatively high light transmitting character and having substantially homogeneously distributed therein light reflecting lamellae aligned in a predetermined direction and uniform manner, said object having a first exposed curved and generally convex surface portion extending generally parallel to the direction of alignment of said light reflecting lamellae so that light is reflected from said light reflecting lamellae through said first surface portion, said first surface portion having a peripheral area of such configuration that upon viewing said first surface portion, light appears to be more strongly reflected from one area thereof than from the remaining areas thereof so as to give the illusion of a cat's eye effect, said first curved surface portion contiguously merging in the form of a continuous curvature into a second curved surface portion which is inclined to the direction of alignment of said light reflecting lamellae so that the light reflected therethrough is negligible relative to the light reflected through said first surface portion, said light reflecting lamellae being aligned concentrically about the axis of the first exposed surface portion.

3. A plastic ornamental object comprising a plastic material having faceted light reflecting particles distributed therein, said ornamental object having in part a continuous curved surface comprising a central band area and two adjacent side areas, the faceted light reflecting particles in said central band area being oriented in a direction generally parallel to said central band area so that light is strongly reflected from said faceted light reflecting particles in said central band area, the faceted light reflecting particles in said side areas being oriented in a direction inclined to the direction of said side areas so that substantially no light is reflected from said faceted light reflecting particles in said side areas, said central band area being so curved that upon viewing said central band area, light appears to be more strongly reflected from one portion thereof than from the remaining portions thereof.

4. A plastic ornamental object comprising a plastic material having faceted light reflecting particles distributed therein, said ornamental object having a substantially spherical curved surface comprising a central band area and two adjacent side areas, the faceted light reflecting particles in said central band area being oriented in a direction generally parallel to said central band area so that light is strongly reflected from said faceted light reflecting particles in said central band area, the faceted light reflecting particles in said side areas being oriented in a direction inclined to the direction of said side areas so that substantially no light is reflected from said faceted light reflecting particles in said side areas, said light reflecting particles being oriented in directions which are concentric about a center corresponding to the axis of said central band area.

5. A method of producing a multiplicity of curved ornamental objects having different areas of different light reflectivity from a generally cylindrical elongated plastic body having faceted light reflecting particles oriented therein in a direction generally parallel to the surface of the body which comprises simultaneously grinding said generally cylindrical body at a plurality of spaced points along said body in a direction generally transverse to the direction of orientation of said faceted light reflecting particles to expose portions beneath the original surface of said body; shaping said exposed portions to provide a series of attached adjacent body elements having substantially convex surface areas, said convex surface areas being in part substantially inclined with respect to the faceted light reflecting particles in said body; continuing the grinding operation until the body elements are separated into a multiplicity of ornamental objects having a substantially convex surface comprising a central peripheral band area and two side areas, the central peripheral band area being generally parallel to the faceted light reflecting particles therebeneath so that light is relatively strongly reflected from said light reflecting particles, the two side areas being generally inclined with respect to the faceted light reflecting particles therebeneath so that relatively little light is reflected from said light reflecting particles beneath said side areas.

6. A method of producing a multiplicity of curved ornamental objects having different areas of different light reflectivity from a generally cylindrical elongated plastic rod having faceted light reflecting particles oriented therein in a direction generally parallel to the surface of the rod which comprises simultaneously grinding said generally cylindrical rod at a plurality of spaced points along said rod in a direction generally transverse to the direction of orientation of said faceted light reflecting particles to expose portions beneath the original surface of said rod; shaping said exposed portions to provide a series of attached adjacent rod elements having substantially convex surface areas, said convex surface areas being in part substantially inclined with respect to the faceted light reflecting particles in said rod; continuing the grinding operation until the rod elements are separated into a multiplicity of ornamental objects having a substantially convex surface comprising a central peripheral band area and two side areas, the central peripheral band area being generally parallel to the faceted light reflecting particles therebeneath so that light is relatively strongly reflected from said light reflecting particles, the two side areas being generally inclined with respect to the faceted light reflecting particles therebeneath so that relatively little light is reflected from said light reflecting particles beneath said side areas; and rotating said multiplicity of separated ornamental objects in various directions while further grinding said objects to remove the outermost layer from the entire periphery of said ornamental objects.

7. A method of producing a multiplicity of curved ornamental objects having different areas of different light reflectivity from a generally cylindrical elongated plastic body comprising a polymerized ester of the acrylic group having faceted light reflecting particles oriented therein in a direction generally parallel to the surface of the body which comprises simultaneously grinding said generally cylindrical body comprising a polymerized ester of the acrylic group in the presence of a substantial quantity of water at a plurality of spaced points along said body in a direction generally transverse to the direction of orientation of said faceted light reflecting particles to expose portions beneath the original surface of said body; shaping said exposed portions to provide a series of attached adjacent body elements having substantially convex surface areas, said convex surface areas being in part substantially inclined with respect to the faceted light reflecting particles in said body; and continuing the grinding operation until the body elements are separated into a multiplicity of ornamental objects having a substantially convex surface comprising a central peripheral band area and two side areas, the central peripheral band area being generally parallel to the faceted light reflecting particles therebeneath so that light is relatively strongly reflected from said light reflecting particles, the two side areas being generally inclined with respect to the faceted light reflecting particles therebeneath so that relatively little light is reflected from said light reflecting particles beneath said side areas.

8. A plastic ornamental object comprising a plastic material having faceted light reflecting particles distributed therein, said ornamental object having a curved surface comprising at least a first and a second area, the faceted light reflecting particles in said first surface area being oriented in a direction generally parallel to said surface so that light is strongly reflected from said faceted light reflecting particles at said first surface area, the faceted light reflecting particles in said second surface area being oriented in a direction inclined to the direction of said surface so that substantially no light is reflected from said faceted light reflecting particles at said second surface area.

9. A plastic ornamental object comprising a plastic material having faceted light reflecting particles distributed therein, said ornamental object having a curved surface comprising at least a first and a second area, the faceted light reflecting particles in said first surface area being oriented in a direction generally parallel to said surface so that light is strongly reflected from said faceted light reflecting particles at said first surface area, the faceted light reflecting particles in said second surface area being oriented in a direction inclined to the direction of said surface so that substantially no light is reflected from said faceted light reflecting particles at said second surface area, said faceted light reflecting particles beneath said second surface area being oriented in substantial parallelism to said faceted light reflecting particles beneath said first surface area.

10. A plastic ornamental object comprising a plastic material having faceted light reflecting particles distributed therein, said ornamental object having a curved surface comprising at least a first area and a second area, the faceted light reflecting particles in said first area being oriented in a direction generally parallel to said surface so that light is strongly reflected from said faceted light reflecting particles in said first area, the faceted light reflecting particles in said second area being oriented in a direction inclined to the direction of said surface so that substantially no light is reflected from said faceted light reflecting particles in said second area, said first area being so curved that upon viewing said first area, light appears to be more strongly reflected from one portion thereof than from the remaining portions thereof.

11. A plastic ornamental object comprising a plastic material having faceted light reflecting particles distributed therein and arranged in a multiplicity of layers, said ornamental object having a curved surface comprising at least a first and a second area, the faceted light reflecting particles in said first surface area being oriented in a direction generally parallel to said surface so that light is strongly reflected from said faceted light reflecting particles at said first surface area, the faceted light reflecting particles in said second surface area being oriented in a direction inclined to the direction of said surface so that substantially no light is reflected from said faceted light reflecting particles at said second surface area, said curved surface intercepting a multiplicity of layers of said oriented faceted light reflecting particles.

12. A plastic ornamental object comprising a plastic material having faceted light reflecting particles distributed therein, said ornamental object having a curved surface comprising a central band area and two adjacent side areas, the faceted light reflecting particles in said central band area being oriented in a direction generally parallel to said central band area so that light is strongly reflected from said faceted light reflecting particles in said central band area, the faceted light reflecting particles in said side areas being oriented in a direction inclined to the direction of said side areas so that substantially no light is reflected from said faceted light reflecting particles in said side areas.

13. An object comprising a synthetic plastic having light reflecting particles distributed therein, said object having an exterior surface continuously curved along at least two different axial directions, one portion of said curved exterior surface having the light reflecting particles so arranged as to impart strong light reflecting characteristics thereto, and another portion of said curved exterior surface having the light reflecting particles so arranged as to impart weak light reflecting characteristics thereto as compared to said first mentioned surface portion.

14. A plastic object having a predetermined degree of light transmitting quality and having faceted light reflecting particles distributed therein, said light reflecting particles being aligned in a predetermined direction therein, said object having at least one curved exposed surface portion extending generally parallel to the direction of alignment of said particles so that light is strongly reflected therethrough, and at least one curved exposed surface portion inclined to the direction of alignment of said particles so that light reflected therethrough is negligible relative to the light reflected through said first surface portion.

15. A plastic object having a predetermined degree of light transmitting quality and having faceted light reflecting particles distributed therein, said light reflecting particles being aligned in a predetermined direction therein, said plastic object having an exterior surface curved with respect to at least two different axial directions, said exterior surface having at least one curved exposed surface portion extending generally parallel to the direction of alignment of said particles so that light is strongly reflected therethrough and at least one curved exposed surface portion inclined to the direction of alignment of said particles so that light reflected therethrough is negligible relative to the light reflected through said first surface portion, said first mentioned curved surface portion merging gradually into said second curved surface portion.

16. An ornamental object comprising a plastic, said object having an exterior surface curved along at least two different axial directions, faceted light reflecting particles substantially uniformly oriented in said plastic, said faceted light reflecting particles being so positioned beneath one curvature of said curved exterior surface so that relatively little light is reflected therefrom, the faceted light reflecting particles being so positioned beneath a second curvature of said curved exterior surface so that light is relatively strongly reflected therefrom.

17. The method of making a light reflecting ornamental object which comprises shaping a plastic in the form of an elongated body, orienting faceted light reflecting particles in said body in directions substantially parallel to the surface of said body, removing material from said elongated body along an arc of curvature which intersects lines extending in the same direction as the axis of said elongated body to form a curved surface beneath which the faceted light reflecting particles are positioned at such an angle that substantially no light is reflected therefrom, the faceted light reflecting particles beneath that surface adjacent the original surface of the body being generally parallel thereto so that light is strongly reflected therefrom.

18. A method of converting a body containing faceted light reflecting particles oriented parallel to the outer surface thereof into ornamental objects having different areas of different light reflecting properties comprising removing material from a portion of the surface of said body to expose portions beneath the original surface of said body and to shape said exposed portions into substantially convex curvature whereby said exposed portions become in part inclined with respect to the faceted light reflecting particles so that relatively little light is reflected from said exposed surface portion while the faceted light reflecting particles at that portion of the ornamental object adjacent the original surface of the body remain generally parallel to the surface of the ornamental object so that light is strongly reflected therefrom.

19. A method of converting a body containing faceted light reflecting particles oriented parallel to the outer surface thereof into ornamental objects having different areas of different light reflecting properties comprising grinding material from a portion of the surface of said body to expose portions beneath the original surface of said body and to shape said exposed portions into substantially convex curvature whereby said exposed portions become in part inclined with respect to the faceted light reflecting particles so that relatively little light is reflected from said exposed surface portion while the faceted light reflecting particles at that portion of the ornamental object adjacent the original surface of the body remain generally parallel to the surface of the ornamental object so that light is strongly reflected therefrom.

20. A method of converting a body containing faceted light reflecting particles oriented parallel to the outer surface thereof into ornamental objects having different areas of different light reflecting properties comprising cutting material from a portion of the surface of said body to expose portions beneath the original surface of said body and to shape said exposed portions into substantially convex curvature whereby said exposed portions become in part inclined with respect to the faceted light reflecting particles so that relatively little light is reflected from said exposed surface portion while the faceted light reflecting particles at that portion of the ornamental object adjacent the original surface of the body remain generally parallel to the surface of the ornamental object so that light is strongly reflected therefrom.

21. A method of converting an elongated body containing faceted light reflecting particles oriented parallel to the outer surface thereof into ornamental objects having different areas of different light reflecting properties comprising removing material from a portion of the surface of said elongated body to expose portions beneath the original surface of said elongated body and to shape said exposed portions into substantially convex curvature whereby said exposed portions become in part inclined with respect to the faceted light reflecting particles so that relatively little light is reflected from said exposed surface portion while the faceted light reflecting particles at that portion of the ornamental object adjacent the original surface of the elongated body remain generally parallel to the surface of the ornamental object so that light is strongly reflected therefrom, and removing at least a thin layer of material from said ornamental object at that surface portion thereof corresponding to the original periphery of said elongated body.

MAXIMILIAN C. MEYER.